(12) United States Patent
Kaneko

(10) Patent No.: US 12,325,811 B2
(45) Date of Patent: Jun. 10, 2025

(54) RADICAL-POLYMERIZABLE ADHESIVE COMPOSITION FOR LAMINATING AND BONDING STEEL PLATES, ADHESIVE LAMINATE, MOTOR, AND METHOD FOR MANUFACTURING ADHESIVE LAMINATE

(71) Applicant: THREEBOND CO., LTD., Tokyo (JP)

(72) Inventor: Satoshi Kaneko, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 334 days.

(21) Appl. No.: 16/769,864

(22) PCT Filed: Nov. 9, 2018

(86) PCT No.: PCT/JP2018/041703
§ 371 (c)(1),
(2) Date: Jun. 4, 2020

(87) PCT Pub. No.: WO2019/123885
PCT Pub. Date: Jun. 27, 2019

(65) Prior Publication Data
US 2021/0171813 A1    Jun. 10, 2021

(30) Foreign Application Priority Data

Dec. 18, 2017  (JP) .................................. 2017-241756

(51) Int. Cl.
*C09J 175/14* (2006.01)
*B32B 7/12* (2006.01)
(Continued)

(52) U.S. Cl.
CPC .............. *C09J 175/14* (2013.01); *B32B 7/12* (2013.01); *B32B 15/043* (2013.01); *B32B 15/08* (2013.01);
(Continued)

(58) Field of Classification Search
None
See application file for complete search history.

(56) References Cited

U.S. PATENT DOCUMENTS 4,044,044 A    8/1977  Saito
4,223,115 A †  9/1980  Zalucha et al.
(Continued)

FOREIGN PATENT DOCUMENTS

EP    2894773 A1 †   7/2015
GB    1543758 A  †   4/1979
(Continued)

OTHER PUBLICATIONS

EPO, Extended European Search Report for the corresponding European Patent Application No. 18891372.7, dated Jul. 8, 2021.
(Continued)

*Primary Examiner* — Kevin R Kruer
(74) *Attorney, Agent, or Firm* — LUCAS & MERCANTI, LLP

(57) ABSTRACT

An object of the present invention is to provide a radical-polymerizable adhesive composition for laminating and bonding steel plates, capable of obtaining an adhesive laminate that contributes to simplification of a process in an adhesive lamination method, and high performance and high reliability of a rotor or a stator of a motor. A radical-polymerizable adhesive composition for laminating and bonding steel plates, exhibiting a value of 8.0 MPa or more in a tensile shear adhesive strength test to an electromagnetic steel plate, and containing: component (A): a radical-polymerizable compound; component (B): a radical-polymerization initiator; and component (C): a phosphate compound having a group represented by the following general formula (1) or (2).

15 Claims, 1 Drawing Sheet

(51) Int. Cl.

| | |
|---|---|
| *B32B 15/04* | (2006.01) |
| *B32B 15/08* | (2006.01) |
| *B32B 15/082* | (2006.01) |
| *B32B 15/18* | (2006.01) |
| *B32B 37/12* | (2006.01) |
| *C08F 220/20* | (2006.01) |
| *C08F 290/06* | (2006.01) |
| *C09J 11/06* | (2006.01) |
| *C09J 163/10* | (2006.01) |

(52) U.S. Cl.
CPC ............ *B32B 15/082* (2013.01); *B32B 15/18* (2013.01); *B32B 37/12* (2013.01); *C08F 220/20* (2013.01); *C08F 290/064* (2013.01); *C08F 290/067* (2013.01); *C09J 11/06* (2013.01); *C09J 163/10* (2013.01); *B32B 2311/30* (2013.01); *C09J 2400/20* (2013.01); *C09J 2463/00* (2013.01); *C09J 2475/00* (2013.01)

(56) References Cited

U.S. PATENT DOCUMENTS

| | | | |
|---|---|---|---|
| 4,322,509 A | 3/1982 | Zalucha | |
| 4,386,194 A * | 5/1983 | Gruber | C09J 4/00 428/463 |
| 4,433,124 A | 2/1984 | Okamoto et al. | |
| 4,990,281 A | 2/1991 | Clark | |
| 9,133,367 B2 * | 9/2015 | Ha | C09J 133/10 |
| 2006/0011293 A1 * | 1/2006 | Xia | C09J 4/00 524/556 |
| 2011/0086973 A1 | 4/2011 | Kobayashi et al. | |
| 2015/0267092 A1 * | 9/2015 | Hill | C09J 4/06 428/463 |
| 2019/0002617 A1 * | 1/2019 | Kotani | C09J 133/08 |
| 2021/0171813 A1 * | 6/2021 | Kaneko | C09J 11/06 |
| 2021/0189201 A1 * | 6/2021 | Piwowar | C09J 163/00 |
| 2021/0292455 A1 * | 9/2021 | Wu | C09D 5/08 |
| 2022/0267508 A1 * | 8/2022 | Yang | C09D 133/066 |

FOREIGN PATENT DOCUMENTS

| | | | |
|---|---|---|---|
| JP | S51-132234 A | | 11/1976 |
| JP | S54-141826 A | | 11/1979 |
| JP | S57-090074 A | | 6/1982 |
| JP | S58-116032 A | | 7/1983 |
| JP | H01-168777 A | † | 7/1989 |
| JP | H10-168398 A | | 6/1998 |
| JP | 2000173815 A | † | 6/2000 |
| JP | 2005269732 A | † | 9/2005 |
| JP | 2006334648 A | † | 12/2006 |
| JP | 5192178 B2 | | 5/2013 |
| JP | 201576970 A | † | 4/2015 |
| JP | 2016117851 A | † | 6/2016 |
| JP | 2017-214499 A | | 12/2017 |
| WO | 1991/005828 A | | 5/1991 |
| WO | 9105828 A1 | † | 5/1991 |
| WO | 2012086445 A1 | | 6/2012 |
| WO | 2015125354 A1 | † | 8/2015 |

OTHER PUBLICATIONS

CNIPA, Office Action for the corresponding Chinese Patent Application No. 201880079204.5, dated Jan. 13, 2022, with English translation.
EPO, Third Party Observations for the corresponding European Patent Application No. 18891372.7, dated Feb. 2, 2021.
PCT, International Search Report for the corresponding patent application No. PCT/JP2018/041703, dated Jan. 29, 2019, with English translation.
PCT, Written Opinion of the International Searching Authority for the corresponding patent application No. PCT/JP2018/041703, dated Jan. 29, 2019.
CNIPA, Office Action for the corresponding Chinese Patent Application No. 201880079204.5, dated Sep. 10, 2021, with English translation.
CNIPA, Office Action for the corresponding Chinese Patent Application No. 201880079204.5, dated Apr. 1, 2022, with English translation.
EPO, Office Action for the corresponding European Patent Application No. 18891372.7, dated May 27, 2022.
Office Action dated Oct. 4, 2022, for the corresponding Japanese Patent Application No. 2019-560861, with English translation.
Office Action dated Feb. 22, 2023, for the corresponding European Patent Application No. 18891372.7.
Office Action dated Nov. 14, 2023, for the corresponding European Patent Application No. 18891372.7.
Office Action Examination Report, dated Aug. 8, 2024, Corresponding to Japanese Patent Application No. 18 891 372.7-1102.
Notice of Reexamination, dated Mar. 19, 2025, issued for the corresponding Chinese Patent Application No. 201880079204.5, 16 pages, with English machine translation.

\* cited by examiner
† cited by third party

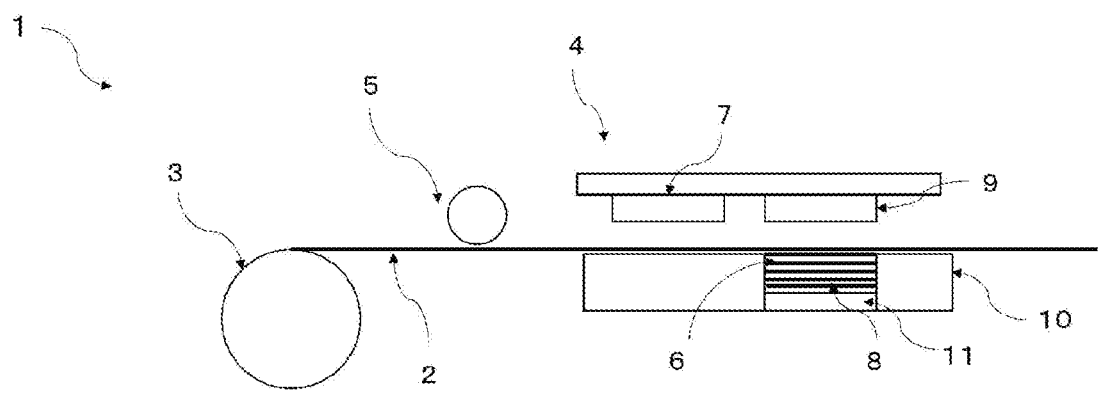

RADICAL-POLYMERIZABLE ADHESIVE COMPOSITION FOR LAMINATING AND BONDING STEEL PLATES, ADHESIVE LAMINATE, MOTOR, AND METHOD FOR MANUFACTURING ADHESIVE LAMINATE

CROSS REFERENCE TO RELATED APPLICATION

This Application is a 371 of PCT/JP2018/041703 filed on Nov. 9, 2018 which, in turn, claimed the priority of Japanese Patent Application No. 2017-241756 filed on Dec. 18, 2017, both applications are incorporated herein by reference.

TECHNICAL FIELD

The present invention relates to a radical-polymerizable adhesive composition for laminating and bonding steel plates (hereinafter, also simply referred to as a radical-polymerizable adhesive composition), an adhesive laminate, a motor, and a method for manufacturing an adhesive laminate.

BACKGROUND ART

At present, a motor is widely used for vibration of a portable electronic terminal, adjustment of a focus of a camera, driving of a hard disk, driving of an automobiles, and the like. A rotor or a stator of the motor includes a laminated steel plate formed by laminating a plurality of electromagnetic steel plates. The laminated steel plate is generally laminated by bolting and crimping. However, with miniaturization of the motor, a need to further reduce a thickness of the laminated steel plate has increased, and stress concentration/strain concentration due to mechanical fastening has become a problem. From such circumstances, adhesive lamination has attracted attention as a method capable of dispersing a stress in a plane.

JP 58-116032 A proposes an adhesive lamination method using an anaerobic adhesive. However, the adhesive lamination method in JP 58-116032 A has a problem that a process becomes complicated because it is necessary to apply the anaerobic adhesive after a punching oil applied to an electromagnetic steel plate is removed. Therefore, J P 2006-334648 A proposes a method for laminating a core using an anaerobic adhesive together with a curing accelerator against the problem of the complicated process.

SUMMARY OF INVENTION

However, there is a problem that the anaerobic adhesive disclosed in JP 2006-334648 A has poor adhesive strength when a surface of an electromagnetic steel plate is covered with a punching oil. Therefore, when an adhesive laminate using the anaerobic adhesive disclosed in JP 2006-334648 A is used for a rotor, a stator, or the like of a motor, reliability is poor.

Therefore, the present invention has been achieved in view of the above circumstances, and an object of the present invention is to provide a radical-polymerizable adhesive composition for laminating and bonding steel plates, capable of providing a laminate that contributes to simplification of a process at the time of manufacturing an adhesively-bonded laminated steel plate, and high performance and high reliability of a rotor or a stator of a motor.

The present invention has the following gist.

[1] A radical-polymerizable adhesive composition for laminating and bonding steel plates, exhibiting a value of 8.0 MPa or more in a following tensile shear adhesive strength test to an electromagnetic steel plate, and containing:
component (A): a radical-polymerizable compound; component (B): a radical-polymerization initiator; and component (C): a phosphate compound having a group represented by the following general formula (1) or (2).

[Chemical formula 1]

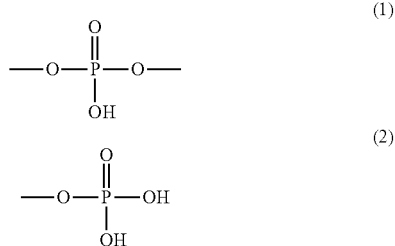

Tensile shear adhesive strength to an electromagnetic steel plate:
  To a test piece of an electromagnetic steel plate having a width of 25 mm, a length of 100 mm, and a thickness of 0.3 mm, 0.1 g of a primer composition containing 100 parts by mass of punching oil, 100 parts by mass of ethanol, and 0.5 part by mass of copper 2-ethylhexanoate is applied, and is left and dried at 25° C. for three hours.
  Next, to the test piece that has been subjected to the primer treatment, 0.1 g of the radical-polymerizable adhesive composition for laminating and bonding steel plates is applied, another test piece that has been subjected to the primer treatment is superimposed thereon such that a length of a longer side end thereof is 10 mm, and a weight of 100 g is placed on a bonding surface and fixed at 25° C. for 24 hours to obtain an adhesion test piece.
  Next, an end of the adhesion test piece is pulled with a universal tensile tester at a pulling speed of 50 mm/min, and tensile shear adhesive strength (MPa) is measured according to JIS K6850 (1999).

[2] The radical-polymerizable adhesive composition for laminating and bonding steel plates according to the above item [1], in which the component (A) contains at least a radical-polymerizable oligomer or a radical-polymerizable polymer.

[3] The radical-polymerizable adhesive composition for laminating and bonding steel plates according to the above item [1] or [2], in which the component (A) contains at least one selected from the group consisting of a urethane (meth) acrylate, an epoxy (meth)acrylate, an ester (meth)acrylate, an isoprene-based (meth)acrylate, a hydrogenated isoprene-based (meth)acrylate, a (meth)acrylic group-containing acrylic polymer, and a (meth)acrylic group-containing polyisobutylene.

[4] The radical-polymerizable adhesive composition for laminating and bonding steel plates according to the above item [1] or [2], in which the component (A) contains a urethane (meth)acrylate or an epoxy (meth)acrylate.

[5] The radical-polymerizable adhesive composition for laminating and bonding steel plates according to any one of the above items [1] to [4], further containing an anaerobic catalyst as a component (D).

[6] The radical-polymerizable adhesive composition for laminating and bonding steel plates according to any one of the above items [1] to [5], in which a glass transition point of a cured product of the radical-polymerizable adhesive composition is 60° C. or higher.

[7] The radical-polymerizable adhesive composition for laminating and bonding steel plates according to any one of the above items [1] to [6], having a viscosity of 30 Pa·s or less.

[8] An adhesive laminate obtained by laminating electromagnetic steel plates using the radical-polymerizable adhesive composition for laminating and bonding steel plates set forth in any one of the above items [1] to [7].

[9] A motor using the adhesive laminate set forth in the above item [8].

[10] A method for manufacturing an adhesive laminate, including: applying a radical-polymerizable adhesive composition for laminating and bonding steel plates exhibiting a value of 8.0 MPa or more in a following tensile shear adhesive strength test to an electromagnetic steel plate to a surface of a strip-shaped steel plate; and laminating electromagnetic steel plates with a press molding machine.

Tensile shear adhesive strength to an electromagnetic steel plate:

To a test piece of an electromagnetic steel plate having a width of 25 mm, a length of 100 mm, and a thickness of 0.3 mm, 0.1 g of a primer composition containing 100 parts by mass of punching oil, 100 parts by mass of ethanol, and 0.5 part by mass of copper 2-ethylhexanoate is applied, and is left and dried at 25° C. for three hours.

Next, to the test piece that has been subjected to the primer treatment, 0.1 g of a radical-polymerizable adhesive composition for laminating and bonding steel plates is applied, another test piece that has been subjected to the primer treatment is superimposed thereon such that a length of a longer side end thereof is 10 mm, and a weight of 100 g is placed on a bonding surface and fixed at 25° C. for 24 hours to obtain an adhesion test piece.

Next, an end of the adhesion test piece is pulled with a universal tensile tester at a pulling speed of 50 mm/min, and tensile shear adhesive strength (MPa) is measured according to JIS K6850 (1999).

[11] The method for manufacturing an adhesive laminate according to the above item [10], in which the radical-polymerizable adhesive composition for laminating and bonding steel plates contains: component (A): a radical-polymerizable compound; component (B): a radical-polymerization initiator; and component (C): a phosphate compound having a group represented by the following general formula (1) or (2).

[Chemical formula 2]

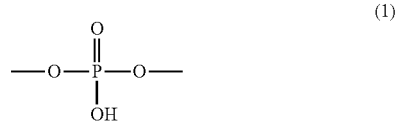

(1)

(2)

BRIEF DESCRIPTION OF DRAWINGS

FIG. 1 is a schematic diagram of an apparatus for manufacturing a laminated steel plate according to an embodiment of the present invention.

DESCRIPTION OF EMBODIMENTS

The details of the present invention will be described below.

<Tensile Shear Adhesive Strength Test to Electromagnetic Steel Plate>

In a radical-polymerizable adhesive composition for laminating and bonding steel plates of the present invention, a value determined by the following tensile shear adhesive strength test to an electromagnetic steel plate is 8.0 MPa or more, preferably 8.2 MPa or more, and particularly preferably 8.5 MPa or more because high reliability is obtained when an adhesive laminate is used for a rotor, a stator, or the like of a motor. In addition, the upper limit of the value determined by the tensile shear adhesive strength test to an electromagnetic steel plate is not particularly limited, but is, for example, preferably 50 MPa or less, more preferably 40 MPa or less, and still more preferably 30 MPa or less.

A method for performing the tensile shear adhesive strength test to an electromagnetic steel plate is as follows.

Tensile shear adhesive strength test to electromagnetic steel plate:

To a test piece of an electromagnetic steel plate having a width of 25 mm, a length of 100 mm, and a thickness of 0.3 mm (35JN300 manufactured by JFE Steel Co., Ltd.), 0.1 g of a primer composition containing 100 parts by mass of punching oil (mineral oil, G6339F manufactured by Nihon Kohsakuyu Co., Ltd.), 100 parts by mass of ethanol, and 0.5 part by mass of copper 2-ethylhexanoate is applied, and is left and dried at 25° C. for three hours.

Next, to the test piece that has been subjected to the primer treatment, 0.1 g of a radical-polymerizable adhesive composition for laminating and bonding steel plates is applied, another test piece that has been subjected to the primer treatment is superimposed thereon such that a length of a longer side end thereof is 10 mm, and a weight of 100 g is placed on a bonding surface and fixed at 25° C. for 24 hours to obtain an adhesion test piece.

Next, an end of the adhesion test piece is pulled with a universal tensile tester at a pulling speed of 50 mm/min, and tensile shear adhesive strength (MPa) is measured according to JIS K6850 (1999).

The present invention provides a radical-polymerizable adhesive composition for laminating and bonding steel plates, capable of providing an adhesive laminate that contributes to simplification of a process in an adhesive lamination method, and high performance and high reliability of a rotor or a stator of a motor.

The radical-polymerizable adhesive composition for laminating and bonding steel plates of the present invention has an adhesive force to an electromagnetic steel plate or a cold-rolled steel plate (SPCC-SD), having a surface covered with a punching oil. Therefore, a step of applying the radical-polymerizable adhesive composition for laminating and bonding steel plates after the punching oil applied to the electromagnetic steel plate is removed in a process of manufacturing an adhesively-bonded laminated steel plate can be omitted. In addition, an adhesive laminate in which steel plates strongly adhere to each other with the radical-polymerizable adhesive composition for laminating and bonding steel plates of the present invention is insulated, and therefore has a small current loss, high performance, and high reliability.

Note that in the present invention, examples of the electromagnetic steel plate include a steel plate mainly used for a motor utilizing electromagnetic characteristics of the steel plate, and the like. However, the electromagnetic steel plate is not particularly limited to this use and may be any publicly-known use.

<Component (A)>

As a compound having a radical-polymerizable functional group (also simply referred to as a radical-polymerizable compound) as a component (A) used in the present invention, for example, a radical-polymerizable monomer or a radical-polymerizable oligomer or polymer, usually used in an adhesive, a paint, and the like can be used. These compounds can be used singly or as a mixture of two or more kinds thereof. Examples of the radical-polymerizable functional group include a (meth)acryloyl group and the like. Note that the component (A) is preferably a radical-polymerizable oligomer or polymer from a viewpoint of an excellent adhesive force to an electromagnetic steel plate having a surface covered with a punching oil. In addition, it is preferable to use a radical-polymerizable monomer together with a radical-polymerizable oligomer or polymer from viewpoints that an adhesive force to an electromagnetic steel plate or a cold-rolled steel plate (SPCC-SD) is better, and that a radical-polymerizable adhesive composition having an appropriate viscosity is obtained and the radical-polymerizable adhesive composition does not extremely protrude from an adhesive surface during bonding of the electromagnetic steel plates. However, a component (C) described later is excluded from the component (A).

Examples of the polymerizable oligomer or polymer include a urethane (meth)acrylate, an epoxy (meth)acrylate, an ester (meth)acrylate, an isoprene-based (meth)acrylate, a hydrogenated isoprene-based (meth)acrylate, a (meth) acrylic group-containing acrylic polymer, and a (meth) acrylic group-containing polyisobutylene, and the like. Among these compounds, a urethane (meth)acrylate or an epoxy (meth)acrylate is preferable because an adhesive force to an electromagnetic steel plate or a cold-rolled steel plate (SPCC-SD) is excellent, and a cured product having a high glass transition point is obtained. An epoxy (meth) acrylate is particularly preferable because an adhesive force to an electromagnetic steel plate or a cold-rolled steel plate (SPCC-SD) is more excellent, and a cured product having a higher glass transition point is obtained. These polymerizable oligomers or polymers can be used singly or as a mixture of two or more kinds thereof.

Examples of the urethane (meth)acrylate include a urethane (meth)acrylate having a polybutadiene skeleton, a urethane (meth)acrylate having a hydrogenated polybutadiene skeleton, a urethane (meth)acrylate having a polycarbonate skeleton, a urethane (meth)acrylate having a polyether skeleton, a urethane (meth)acrylate having a polyester skeleton, a urethane (meth)acrylate having a castor oil skeleton, and the like.

Specific examples of the epoxy (meth)acrylate include a compound or the like obtained by a reaction product of an epoxy resin such as a bisphenol A type epoxy resin, a bisphenol F type epoxy resin, a phenol novolak type epoxy resin, or a terminal glycidyl ether of an alkylene oxide adduct of bisphenol A or bisphenol F with (meth)acrylic acid, and the like. Among these compounds, a compound obtained by a reaction product of an epoxy resin such as a terminal glycidyl ether of bisphenol A or bisphenol F with (meth)acrylic acid, or the like is particularly preferable from a viewpoint of an excellent adhesive force not only to an electromagnetic steel plate but also to a cold-rolled steel plate. The above epoxy (meth)acrylate may be caused to react by adding an acid anhydride or a dicarboxylic acid compound. Examples of the acid anhydride include maleic anhydride, itaconic anhydride, phthalic anhydride, succinic anhydride, tetrahydrophthalic anhydride, and the like. Examples of the dicarboxylic acid compound include maleic acid, phthalic acid, succinic acid, tetrahydrophthalic acid, and the like.

Examples of a commercially available product of the compound obtained by a reaction product of an epoxy resin such as a terminal glycidyl ether of bisphenol A or bisphenol F with (meth)acrylic acid, or the like include DICLITE (registered trademark) UE-8071-60BH, UE-8740, and UE-8410 (manufactured by DIC Corporation), KAYARD R-115F (manufactured by Nippon Kayaku Co., Ltd.), HITALOID (registered trademark) 7851 (manufactured by Hitachi Chemical Co., Ltd.), EPDXY ESTER 3000MK and 3000A (manufactured by Kyoeisha Chemical Co., Ltd.), VISCOAT V #540 (manufactured by Osaka Organic Chemical Industry Co., Ltd.), EBECRYL (registered trademark) 600 and EBECRYL (registered trademark) 3700 (manufactured by Daicel Ornex Co., Ltd.), and the like. One or more of these products may be used.

Examples of the radical-polymerizable monomer include a monofunctional monomer, a polyfunctional monomer, and the like. Among these monomers, a polyfunctional monomer is preferable from a viewpoint that a radical-polymerizable adhesive composition for laminating and bonding steel plates, in which an adhesive force to an electromagnetic steel plate or a cold-rolled steel plate (SPCC-SD) is better, and a cured product having a high glass transition point is provided, is obtained.

Examples of the monofunctional monomer include lauryl (meth)acrylate, stearyl (meth)acrylate, tetrahydrofurfuryl (meth)acrylate, caprolactone-modified tetrahydrofurfuryl (meth)acrylate, cyclohexyl (meth)acrylate, dicyclopentanyl (meth)acrylate, isobornyl (meth)acrylate, benzyl (meth) acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth) acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexyl polyethylene glycol (meth)acrylate, nonylphenyl polypropylene glycol (meth)acrylate, methoxydipropylene glycol (meth) acrylate, glycidyl (meth)acrylate, 2-hydroxyethyl (meth) acrylate, 2-hydroxypropyl (meth)acrylate, 2-hydroxybutyl (meth)acrylate, glycerol (meth)acrylate, polyethylene glycol (meth)acrylate, polypropylene glycol (meth)acrylate, modified butyl (meth)acrylate, epichlorohydrin-modified phenoxy (meth)acrylate, ethylene oxide-modified phthalic acid (meth)acrylate, ethylene oxide-modified succinic acid (meth)acrylate, caprolactone-modified 2-hydroxyethyl (meth)acrylate, N,N-dimethylaminoethyl (meth)acrylate, N,N-diethylaminoethyl (meth)acrylate, morpholino (meth) acrylate, and the like. Among these compounds, dicyclopentanyl (meth)acrylate, isobornyl (meth)acrylate, benzyl (meth)acrylate, phenyl (meth)acrylate, phenoxyethyl (meth) acrylate, 2-hydroxyethyl (meth)acrylate, 2-hydroxypropyl (meth)acrylate, 2-hydroxybutyl (meth)acrylate, and the like are preferable from a viewpoint that an adhesive force to an electromagnetic steel plate or a cold-rolled steel plate (SPCC-SD) is better.

Examples of the polyfunctional monomer include a difunctional monomer, a trifunctional monomer, and the like.

The polyfunctional monomer is not particularly limited. However, examples thereof include 1,3-butylene glycol di(meth)acrylate, 1,4-butylene glycol di(meth)acrylate, neopentyl glycol di(meth)acrylate, 1,6-hexane glycol di(meth)acrylate, ethylene glycol di(meth)acrylate, polyethylene glycol di(meth)acrylate, propylene glycol di(meth)acrylate, tripropylene glycol di(meth)acrylate, ethylene oxide-modified neopentyl glycol di(meth)acrylate, propylene oxide-modified neopentyl glycol di(meth)acrylate, hydroxypivalate neopentyl glycol diacrylate, caprolactone-modified hydroxypivalate neopentyl glycol diacrylate, neopentyl glycol-modified trimethylolpropane di(meth)acrylate, stearic acid-modified pentaerythritol di(meth)acrylate, dicyclopentenyl di(meth)acrylate, ethylene oxide-modified dicyclopentenyl di(meth)acrylate, di(meth)acryloyl isocyanurate, dimethylol tricyclodecane di(meth)acrylate, trimethylolpropane tri(meth)acrylate, pentaerythritol tri(meth)acrylate, ethylene oxide-modified trimethylolpropane tri(meth)acrylate, propylene oxide-modified trimethylolpropane tri(meth)acrylate, epichlorohydrin-modified trimethylolpropane tri(meth)acrylate, epichlorohydrin-modified glycerol tri(meth)acrylate, tris(acryloyloxyethyl) isocyanurate, ditrimethylolpropane tetra(meth)acrylate, pentaerythritol tetra(meth)acrylate, dipentaerythritol monohydroxypenta(meth)acrylate, alkyl-modified dipentaerythritol pentaacrylate, dipentaerythritol hexa(meth)acrylate, caprolactone-modified dipentaerythritol hexa(meth)acrylate, and the like. Among these compounds, dicyclopentenyl di(meth)acrylate, ethylene oxide-modified dicyclopentenyl di(meth)acrylate, di(meth)acryloyl isocyanurate, dimethylol tricyclodecane di(meth)acrylate, trimethylolpropane tri(meth)acrylate, pentaerythritol tri(meth)acrylate, tris(acryloyloxyethyl) isocyanurate, ditrimethylolpropane tetra(meth)acrylate, pentaerythritol tetra(meth)acrylate, dipentaerythritol monohydroxypenta(meth)acrylate, and the like are preferable from viewpoints that an adhesive force to an electromagnetic steel plate or a cold-rolled steel plate (SPCC-SD) is better and that a cured product having a high glass transition point is obtained. These polyfunctional monomers can be used singly or as a mixture of two or more kinds thereof.

<Component (B)>

Examples of the radical-polymerization initiator as a component (B) used in the present invention include an organic peroxide, a photo-radical generator, and the like. However, in the present invention, the organic peroxide is preferable from a viewpoint of being able to impart anaerobic curability and heat curability. Examples of the organic peroxide include a hydroperoxide such as cumene hydroperoxide, t-butyl hydroperoxide, p-methane hydroperoxide, methyl ethyl ketone peroxide, cyclohexane peroxide, dicumyl peroxide, or diisopropylbenzene hydroperoxide, a ketone peroxide, a diallyl peroxide, or a peroxyester, and the like. These organic peroxides can be used singly or as a mixture of two or more kinds thereof. Among these compounds, a hydroperoxide is preferably used from a viewpoint that reactivity and storage stability of the radical-polymerizable adhesive composition for laminating and bonding steel plates are better.

As the organic peroxide, an organic peroxide having a one-hour half-life temperature within a range of 80 to 300° C. is preferable, and an organic peroxide having a one-hour half-life temperature within a range of 100 to 200° C. is more preferable from a viewpoint of excellent anaerobic curability. The one-hour half-life temperature is a value measured by thermal decomposition in benzene under a condition that the concentration of a peroxide is 0.1 mol/L.

Examples of the organic peroxide having a one-hour half-life temperature within a range of 80 to 300° C. include a hydroperoxide. Specific examples of the hydroperoxides include p-menthane hydroperoxide, diisopropylbenzene hydroperoxide, 1,1,3,3-tetramethylbutyl hydroperoxide, cumene hydroperoxide, t-butyl hydroperoxide, and the like, but are not limited thereto. These compounds may be used singly or in combination of two or more kinds thereof.

The addition amount of the organic peroxide is preferably within a range of 0.05 to 10 parts by mass, and more preferably within a range of 0.1 to 5 parts by mass with respect to 100 parts by mass of the component (A). When the addition amount of the organic peroxide is within the above range, a better adhesive force can be exhibited.

The photo-radical generator is not particularly limited. However, examples thereof include an acetophenone-based photo-radical polymerization initiator, a benzoin-based photo-radical polymerization initiator, a benzophenone-based photo-radical polymerization initiator, a thioxanthone-based photo-radical polymerization initiator, an acylphosphine oxide-based photo-radical polymerization initiator, a titanocene-based photo-radical polymerization initiator, and the like.

Examples of the acetophenone-based photo-radical polymerization initiator include diethoxyacetophenone, 2-hydroxy-2-methyl-1-phenyl-propan-1-one, benzyldimethylketal, 4-(2-hydroxyethoxy) phenyl-(2-hydroxy-2-propyl) ketone, 1-hydroxy-cyclohexyl-phenyl-ketone, 2-methyl-2-morpholino (4-thiomethylphenyl) propan-1-one, 2-benzyl-2-dimethylamino-1-(4-morpholinophenyl) butanone, 2-hydroxy-2-methyl-1-[4-(1-methylvinyl) phenyl] propanone oligomer, and the like, but are not limited thereto. Examples of a commercially available product of the acetophenone-based photo-radical polymerization initiator include IRGACURE 184, IRGACUR 1173, IRGACURE 2959, and IRGACURE 127 (manufactured by BASF), and ESACUREKIP-150 (manufactured by Lamberti s.p.a.).

Examples of the acylphosphine oxide-based photo-radical polymerization initiator include bis(2,4,6-trimethylbenzoyl)-phenyl-phosphine oxide, 2,4,6-trimethylbenzoyl-diphenyl-phosphine oxide, and the like, but are not limited thereto. Examples of a commercially available product of the acylphosphine oxide-based photo-radical polymerization initiator include Omnirad TPO and Omnirad 819 (manufactured by IGM Resins B.V.), and IRGACURE 819DW (manufactured by BASF).

The blending amount of the component (B) is preferably within a range of 0.05 to 10 parts by mass, and more preferably within a range of 0.1 to 5 parts by mass with respect to 100 parts by mass of the component (A). When the blending amount of the component (B) is within the above range, reactivity and the storage stability of the radical-polymerizable adhesive composition for laminating and bonding steel plates are better.

<Component (C)>

A component (C) of the present invention is a phosphate compound having a group represented by the following general formula (1) or (2). Combination thereof with the other components of the present invention provides a remarkable effect that a radical-polymerizable adhesive composition for laminating and bonding steel plates exhibiting an adhesive force to an electromagnetic steel plate having a surface covered with a punching oil can be obtained.

[Chemical formula 3]

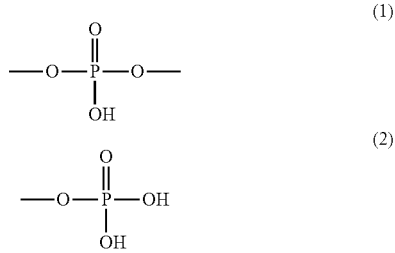

The component (C) is not particularly limited. However, examples thereof include 2-hydroxymethyl (meth)acrylate acid phosphate, 2-hydroxyethyl (meth)acrylate acid phosphate, 2-hydroxypropyl (meth)acrylate acid phosphate, ethylene oxide-modified phosphoric acid di(meth)acrylate, ethylene oxide-modified phosphoric acid tri(meth)acrylate, caprolactone-modified ethylene oxide-modified phosphoric acid di(meth)acrylate, and the like. These compounds may be used singly or in combination of two or more kinds thereof. Note that the component (C) of the present invention is different from the component (A) of the present invention.

Examples of a commercially available product of the component (C) include LIGHT ESTER P-A, P-1M, and P-2M (manufactured by Kyoeisha Chemical Co., Ltd.), KAYAMER PM-1 (manufactured by Nippon Kayaku Co., Ltd.), JPA-514 (manufactured by Johoku Chemical Co., Ltd.), and the like.

The blending amount of the component (C) is not particularly limited, but is preferably 0.1 to 50 parts by mass, more preferably 0.5 to 25 parts by mass, and still more preferably 1 to 10 parts by mass with respect to 100 parts by mass of the total amount of the component (A). When the blending amount of the component (C) is within the above range, an adhesive force to an electromagnetic steel plate having a surface covered with a punching oil is better.

<Component (D)>

The radical-polymerizable adhesive composition of the present invention preferably further contains an anaerobic catalyst as a component (D). Examples of the anaerobic catalyst as the component (D) of the present invention include saccharin, an amine compound, an azole compound, a mercaptan compound, a hydrazine compound, and the like, and these compounds can be used singly or in combination. Among the compounds as the components (D), saccharin is preferable because of excellent anaerobic curability. Note that usually, the component (B) and the component (D) are used together.

By blending the component (D), good anaerobic curability can be achieved. The addition amount of the component (D) is not particularly limited, but is preferably 0.1 to 10 parts by mass with respect to 100 parts by mass of the component (A). When the addition amount of the component (D) is within the above range, anaerobic curability and storage stability of the radical-polymerizable adhesive composition for laminating and bonding steel plates are better.

Examples of the amine compound include a heterocyclic secondary amine such as 1,2,3,4-tetrahydroquinoline or 1,2,3,4-tetrahydroquinaldine, a heterocyclic tertiary amine such as quinoline, methylquinoline, quinaldine, or quinoxaline phenazine, an aromatic tertiary amine such as N,N-dimethyl-anisidine or N,N-dimethylaniline, and the like.

Examples of the azole compound include 1,2,4-triazole, oxazole, oxadiazole, thiadiazole, benzotriazole, hydroxybenzotriazole, benzoxazole, 1,2,3-benzothiadiazole, 3-mercaptobenzotrizole, and the like.

Examples of the mercaptan compound include a linear mercaptan such as n-dodecyl mercaptan, ethyl mercaptan, or butyl mercaptan, and the like, but are not limited thereto.

Examples of the hydrazine compound include 1-acetyl-2-phenylhydrazine, 1-acetyl-2 (p-tolyl) hydrazine, 1-benzoyl-2-phenylhydrazine, 1-(1',1',1'-(trifluoro) acetyl-2-phenylhydrazine, 1,5-diphenyl-carbohydrazine, 1-formyl-2-phenylhydrazine, 1-acetyl-2-(p-bromophenyl) hydrazine, 1-acetyl-2-(p-nitrophenyl) hydrazine, 1-acetyl-2-(2'-phenylethylhydrazine), p-nitrophenylhydrazine, p-trisulfonylhydrazide, and the like, but are not limited thereto.

<Optional Component in Radical-Polymerizable Adhesive Composition>

To the radical-polymerizable adhesive composition for laminating and bonding steel plates of the present invention, an additive such as a filler, various elastomers, a storage stabilizer, an antioxidant, a light stabilizer, a heavy metal deactivator, a silane coupling agent, a tackifier, a plasticizer, a defoamer, a pigment, a rust inhibitor, a leveling agent, a dispersant, a rheology modifier, or a flame retardant can be used as long as the object of the present invention is not impaired.

To the radical-polymerizable adhesive composition of the present invention, for the purpose of improving the elastic modulus, fluidity, and the like of a cured product of the radical-polymerizable adhesive composition, a filler may be added in an amount that does not impair storage stability. Specific examples of the filler include an organic powder, an inorganic powder, and the like.

The inorganic powder filler is not particularly limited, but examples thereof include glass, fumed silica, alumina, mica, ceramics, a silicone rubber powder, calcium carbonate, aluminum nitride, a carbon powder, kaolin clay, dried clay mineral, dried diatomaceous earth, and the like. The blending amount of the inorganic powder is preferably about 0.1 to 100 parts by mass with respect to 100 parts by mass of the component (A).

Fumed silica is blended for the purpose of adjusting the viscosity of the radical-polymerizable adhesive composition for laminating and bonding steel plates or improving the mechanical strength of a cured product thereof. Preferably, fumed silica or the like surface-treated with dimethylsilane, trimethylsilane, alkylsilane, methacryloxysilane, organochlorosilane, polydimethylsiloxane, hexamethyldisilazane, or the like is used. Examples of a commercially available product of fumed silica include Aerosil (registered trademark) R972, R972V, R972CF, R974, R976, R976S, R9200, RX50, NAX50, NX90, RX200, RX300, R812, R812S, R8200, RY50, NY50, RY200S, RY200, RY300, R104, R106, R202, R805, R816, T805, R711, RM50, R7200, and the like (manufactured by Nippon Aerosil Co., Ltd.).

The organic powder filler is not particularly limited, but examples thereof include polyethylene, polypropylene, nylon (registered trademark), crosslinked acryl, crosslinked polystyrene, polyester, polyvinyl alcohol, polyvinyl butyral, polycarbonate, and the like. The blending amount of the organic powder is preferably about 0.1 to 100 parts by mass with respect to 100 parts by mass of the component (A).

A storage stabilizer may be added to the radical-polymerizable adhesive composition of the present invention. As the storage stabilizer, a radical absorber such as benzoquinone, hydroquinone, or hydroquinone monomethyl ether, a metal chelating agent such as ethylenediaminetetraacetic acid or a 2-sodium salt thereof, oxalic acid, acetylacetone, or o-aminophenol, and the like can also be added.

An antioxidant may be added to the radical-polymerizable adhesive composition of the present invention. Examples of the antioxidant include: a quinone-based compound such as β-naphthoquinone, 2-methoxy-1,4-naphthoquinone, methylhydroquinone, hydroquinone, hydroquinone monomethyl ether, mono-tert-butylhydroquinone, 2,5-di-tert-butylhydroquinone, p-benzoquinone, 2,5-diphenyl-p-benzoquinone, or 2,5-di-tert-butyl-p-benzoquinone; a phenol such as phenothiazine, 2,2-methylene-bis(4-methyl-6-tert-butylphenol), catechol, tert-butylcatechol, 2-butyl-4-hydroxyanisole, 2,6-di-tert-butyl-p-cresol, 2-tert-butyl-6-(3-tert-butyl-2-(hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 4,4'-butylidenebis(6-tert-butyl-3-methylphenol), 4,4'-thiobis(6-tert-butyl-3-methylphenol), 3,9-bis[2-[3-(3-tert-butyl-4-hydroxy-5-methylphenyl) propionyloxy]-1,1-dimethylethyl-2,4,8,10-tetraoxaspiro [5,5] undecane, pentaerythritol tetrakis[3-(3,5-di-tert-butyl-4-hydroxyphenyl) propionate], thiodiethylenebis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxyphenyl) propionamide], benzenepropanoic acid, 3,5-bis(1,1-dimethylethyl)-4-hydroxy-, C7-C9 side chain alkyl ester, 2,4-dimethyl-6-(1-methylpentadecyl) phenol, diethyl [[3,5-bis (1,1-dimethylethyl)-4-hydroxyphenyl] methyl] phosphonate, 3,3',3",5,5',5"-hexa-tert-butyl-a,a',a"-(mesitylene-2,4,6-tolyl) tri-p-cresol, calcium diethyl bis[[3,5-bis(1, 1-dimethylethyl)-4-hydroxyphenyl] methyl] phosphonate, 4,6-bis(octylthiomethyl)-o-cresol, ethylenebis(oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl) methyl]-1,3,5-triazine-2,4,6 (1H,3H, 5H)-trione, a reaction product of N-phenylbenzeneamine and 2,4,6-trimethylpentene, 2,6-di-tert-butyl-4-(4,6-bis(octylthio)-1,3,5-triazin-2-ylamino) phenol, picric acid, or citric acid; a phosphorus-based compound such as tris(2,4-di-tert-butylphenyl) phosphite, tris[2-[[2,4,8,10-tetra-tert-butyldibenzo [d,f] [1,3,2] dioxaphosphefin-6-yl] oxy] ethyl] amine, bis(2,4-di-tert-butylphenyl) pentaerythritol diphosphite, bis[2,4-bis (1,1-dimethylethyl)-6-methylphenyl]ethyl ester phosphite, tetrakis(2,4-di-(tert-butylphenyl) [1,1-bisphenyl]-4,4'-diylbisphosphonite, or 6-[3-(3-tert-butyl-4-hydroxy-5-methylphenyl) propoxy]-2,4,8,10-tetra-tert-butyldibenz [d,f] [1,3,2] dioxaphosphefine; a sulfur-based compound such as dilauryl 3,3'-thiodipropionate, dimyristyl 3,3'-thiodipropionate, distearyl 3,3'-thiodipropionate, pentaerythrityltetrakis(3-laurylthiopropionate), or 2-mercaptobenzimidazole; an amine-based compound such as phenothiazine; a lactone-based compound; a vitamin E-based compound, and the like. Among these compounds, a phenol-based compound is suitable.

A silane coupling agent may be added to the radical-polymerizable adhesive composition of the present invention. The silane coupling agent is not particularly limited, but examples thereof include γ-chloropropyl trimethoxysilane, octenyl trimethoxysilane, glycidoxyoctyl trimethoxysilane, β-(3,4-epoxycyclohexyl) ethyl trimethoxysilane, γ-glycidoxypropyl trimethoxysilane, γ-ureidopropyl triethoxysilane, p-styryl trimethoxysilane, and the like. The content of the silane coupling agent (adhesion imparting agent) is preferably 0.05 to 30 parts by mass, and more preferably 0.2 to 10 parts by mass with respect to 100 parts by mass of the component (A) from a viewpoint of a better adhesive force to an electromagnetic steel plate or a cold-rolled steel plate.

The radical-polymerizable adhesive composition for laminating and bonding steel plates of the present invention can be manufactured by a conventionally publicly-known method. For example, the radical-polymerizable adhesive composition for laminating and bonding steel plates of the present invention can be manufactured by blending predetermined amounts of the components (A) to (D) and mixing the components (A) to (D) using a mixing means such as a mixer, preferably at a temperature of 10 to 100° C., preferably for 0.1 to 5 hours.

<Tensile Shear Adhesive Strength Test to Cold-Rolled Steel Plate (SPCC-SD)>

In the radical-polymerizable adhesive composition for laminating and bonding steel plates of the present invention, a value determined by the following tensile shear adhesive strength test to a cold-rolled steel plate (SPCC-SD) is preferably 4.0 MPa or more, more preferably 7.0 MPa or more, and still more preferably 10.0 MPa or more because high reliability is obtained when an adhesive laminate is used for a rotor, a stator, or the like of a motor. In addition, the upper limit of the value determined by the tensile shear adhesive strength test to a cold-rolled steel plate (SPCC-SD) is not particularly limited, but is, for example, preferably 50 MPa or less, more preferably 40 MPa or less, and still more preferably 30 MPa or less. A method for performing the tensile shear adhesive strength test to a cold-rolled steel plate (SPCC-SD) is as follows.

Tensile shear adhesive strength test to cold-rolled steel plate (SPCC-SD):

To a test piece of an SPCC-SD (cold-rolled steel plate) having a width of 25 mm, a length of 100 mm, and a thickness of 1 mm, 0.1 g of a primer composition containing 100 parts by mass of punching oil (mineral oil, G6339F manufactured by Nihon Kohsakuyu Co., Ltd.), 100 parts by mass of ethanol, and 0.5 parts by mass of copper 2-ethylhexanoate is applied, and is left and dried at 25° C. for three hours.

Next, to the test piece that has been subjected to the primer treatment, 0.1 g of the radical-polymerizable adhesive composition for laminating and bonding steel plates is applied. Another test piece that has been subjected to the primer treatment is superimposed thereon such that a length of a longer side end thereof is 10 mm. A weight of 100 g is placed on a bonding surface and fixed at 25° C. for 24 hours to obtain an adhesion test piece.

Next, an end of the adhesion test piece is pulled with a universal tensile tester at a pulling speed of 50 mm/min, and tensile shear adhesive strength (MPa) is measured according to JIS K6850 (1999).

<Primer Composition>

The primer composition used in the present invention is not particularly limited, but examples thereof include a composition obtained by diluting a punching oil, copper ethylhexanoate, pentadione iron, pentadione cobalt, pentadione copper, propylenediamine copper, ethylenediamine copper, iron naphthate, nickel naphthate, cobalt naphthate, copper naphthate, copper octate, iron hexoate, iron propionate, vanadium acetylacetonate, and the like with a solvent such as ethanol, toluene, acetone, or heptone, and the like.

<Regarding Glass Transition Point>

The glass transition point of a cured product of the radical-polymerizable adhesive composition for laminating and bonding steel plates of the present invention is preferably 60° C. or higher, and more preferably 70° C. or higher from a viewpoint that heat resistance of an adhesive laminate can be improved. A method for performing a test of the glass transition point is as follows.

The radical-polymerizable adhesive composition for laminating and bonding steel plates is sandwiched between two polytetrafluoroethylene plates with a clearance of 1.0 mm. Thereafter, the composition is heated at 180° C. for one hour as a curing condition to manufacture a cured product.

Next, the manufactured cured product is cut into a size of 10 mm in width×50 mm in length×1.0 mm in thickness, and measurement is performed using DMS 6100 manufactured by Seiko Instruments Inc. within a temperature range of 25 to 350° C. at a temperature-rising rate of 5° C./min in a tension mode of frequency 1 Hz. The glass transition point is determined as a peak value of tan δ.

<Regarding Viscosity>

The viscosity of the radical-polymerizable adhesive composition for laminating and bonding steel plates of the present invention is preferably 30 Pa·s or less, more preferably 0.05 Pa·s or more and 30 Pa·s or less, and still more preferably 0.5 Pa·s or more and 15 Pa·s or less. The viscosity of the radical-polymerizable adhesive composition is preferably 30 Pa·s or less, and more preferably 15 Pa·s or less from a viewpoint that the radical-polymerizable adhesive composition applied to an electromagnetic steel plate easily and appropriately spreads over the entire surface. In addition, the viscosity of the radical-polymerizable adhesive composition is preferably 0.05 Pa·s or more, and more preferably 0.5 Pa·s or more from a viewpoint that the radical-polymerizable adhesive composition does not extremely protrude from an adhesive surface during bonding of the electromagnetic steel plates. A method for performing a test of the viscosity of the radical-polymerizable adhesive composition for laminating and bonding steel plates is as follows.

0.5 mL of the radical-polymerizable adhesive composition for laminating and bonding steel plates was sampled and discharged into a measuring cup. A viscosity is measured with an EHD type viscometer (manufactured by Toki Sangyo Co., Ltd.) in an environment of 25° C. under a condition of a shear rate of 76.6 [1/s].

<Apparatus for Manufacturing Adhesive Laminate Obtained by Laminating Electromagnetic Steel Plates>

As illustrated in FIG. 1, an apparatus 1 for manufacturing an adhesive laminate obtained by laminating electromagnetic steel plates includes a roll device 3 that sends out a strip-shaped steel plate 2 in a direction of a press forming device 4, an application device 5 that applies a punching oil and a radical-polymerizable adhesive composition simultaneously or separately to the strip-shaped steel plate 2, and the press forming device 4. The press forming device 4 includes a punch-off punching unit 7 for punching off a portion such as a slot or an inner diameter of an electromagnetic steel plate from the strip-shaped steel plate 2, a press punching unit 9 for punching off and pressing an outer diameter portion of an electromagnetic steel plate from the strip-shaped steel plate 2, a storage holding hole 6 of an adhesive laminate for bonding and laminating punched-off and pressed electromagnetic steel plates until the number of punched-off and pressed electromagnetic steel plates reaches a predetermined number, and storing and holding the electromagnetic steel plates, disposed immediately below the press punching unit 9, and a bottom portion 11 of the press forming device. The thickness of the strip-shaped steel plate 2 is preferably within a range of 0.05 to 5.0 mm, and more preferably 0.1 to 3 mm from a viewpoint of punching workability.

In the present invention, the punching unit performs punching-off and pressing on the strip-shaped steel plate 2 and laminates the strip-shaped steel plate 2. Punching-off and pressing may be performed using the same punching member, or may be performed using two or more punching members. In a case of the apparatus 1 for manufacturing an adhesive laminate obtained by laminating electromagnetic steel plates, illustrated in FIG. 1, the punch-off punching unit 7 punches off a portion such as a slot or an inner diameter of an electromagnetic steel plate from the strip-shaped steel plate 2, and the press punching unit 9 not only punches off an outer diameter of an electromagnetic steel plate from the strip-shaped steel plate 2 but also presses the outer diameter of the electromagnetic steel plate.

Manufacturing Method

First Embodiment

A method for manufacturing an adhesive laminate obtained by laminating electromagnetic steel plates is not particularly limited, but, for example, as illustrated in FIG. 1, includes: a step 1 of simultaneously or separately applying a punching oil and a radical-polymerizable adhesive composition to one surface or both surfaces of the strip-shaped steel plate supplied from the roll device 3 that sends out the strip-shaped steel plate 2 in a direction of the press forming device 4 with the application device 5; and a step 2 of punching off the strip-shaped steel plate 2 by the punch-off punching unit 7 in the press forming device 4, then punching off the strip-shaped steel plate by the pressing punch 9, sequentially laminating (bonding and laminating) an electromagnetic steel plate on the already laminated electromagnetic steel plates (adhesive laminate 8 in which the number of laminated electromagnetic steel plates has not reached a predetermined number), and storing the electromagnetic steel plates in the storage holding hole 6 of the adhesive laminate. Note that when the punching oil and the radical-polymerizable adhesive composition are applied to both surfaces of the strip-shaped steel plate, the application device 5 of FIG. 1 may be disposed on both upper and lower surfaces of the strip-shaped steel plate 2. In addition, the surfaces of the punching units 7 and 9 in contact with the strip-shaped steel plate 2 may be subjected to a surface treatment in order to prevent adhesion of the punching oil and the radical-polymerizable adhesive composition applied to the surface of the strip-shaped steel plate 2 thereto. When the punching oil and the radical-polymerizable adhesive composition are applied to both surfaces of the strip-shaped steel plate, at least a portion of a transport line in contact with the strip-shaped steel plate 2 may be subjected to a surface treatment similar to the surface treatment described above.

The punching oil is used for the purpose of preventing galling and seizure, and examples thereof include a punching oil and the like. The component of the oil is not particularly limited, but examples thereof include those containing a mineral oil or a synthetic oil as a main component. A rust inhibitor, an antiseptic agent, or the like may be further added as an optional component.

The method for laminating an electromagnetic steel plate in the step 2 may be a method for pressing an electromagnetic steel plate while no electromagnetic steel plate is placed or on one or more electromagnetic steel plates which have already been placed (adhesive laminate 8 in which the number of laminated electromagnetic steel plates has not reached a predetermined number) on the bottom portion 11 of the press forming device with a press pressure of the pressing punch 9, or a method for only placing an electromagnetic steel plate thereon without pressing the electromagnetic steel plate. In addition, a punched-off electromagnetic steel plate may be laminated immediately or after a predetermined time while no electromagnetic steel plate is placed or on one or more electromagnetic steel plates which have already been placed (adhesive laminate 8 in which the number of laminated electromagnetic steel plates has not reached a predetermined number) on the bottom portion 11 of the press forming device. The one or more electromagnetic steel plates which have already been placed (adhesive laminate 8 in which the number of laminated electromagnetic steel plates has not reached a predetermined number) mean an adhesive laminate in which the number of laminated electromagnetic steel plates has not reached a predetermined number, the adhesive laminate being obtained by performing an operation of pressing a steel plate body with a press pressure of the punch 9 or placing the steel plate body without pressing the steel plate body one or more times. The adhesive lamination means that a laminate is obtained by curing or drying a radical-polymerizable adhesive composition. In the step 2, the punched-off electromagnetic steel plates may be sequentially laminated (bonded and laminated) and stored in the storage holding hole 6 formed immediately below the punching unit 9, and the resulting laminate may be pressed by the punching unit 9 when the number of the laminated electromagnetic steel plates reaches a predetermined number, thus forming the adhesive laminate 8.

Note that in FIG. 1, the number of the punch-off punching units 7 is one. However, for example, in a case of a rotor core, a plurality of the punch-off punching units 7 such as a punch-off punching unit for a slot portion and a punch-off punching unit for an inner diameter portion may be disposed because punch-off accuracy can be enhanced. In addition, the width of the strip-shaped steel plate 2 may be increased, and a plurality of the punching units 7 and 9, a plurality of the storage holding holes 6, and the like may be disposed in a width direction of the strip-shaped steel plate 2 to form a line that can form a plurality of adhesive laminates 8 simultaneously because manufacturing efficiency can be enhanced. When an adhesive laminate obtained by laminating electromagnetic steel plates of a motor is manufactured, examples of the punching-off shape include a slot shape, a tooth shape, and the like, with respect to the strip-shaped steel plate 2.

An application method in the application device 5 is not particularly limited, but examples thereof include a roller, dispensing, spraying, inkjet, dipping, and the like.

Furthermore, in order to cure the radical-polymerizable adhesive composition between the laminated electromagnetic steel plates constituting the obtained adhesive laminate in a short time, heating is preferably performed. The heating method is not particularly limited, but examples thereof include a thermostat, a far-infrared heater, and the like. The temperature and time during heating may be any temperature and any time as long as curing can be sufficiently performed. However, for example, it is appropriate to perform heating at a temperature of 40 to 300° C., preferably 60 to 200° C., for example, 10 seconds to three hours, preferably 20 seconds to 60 minutes. When the adhesive laminate is put in the thermostat, it is preferable to fix the adhesive laminate with a fixing jig or the like in advance because displacement can be prevented. Note that it is also possible to accelerate curing of the radical-polymerizable adhesive composition by disposing a heater in a lower portion 10 of the press device in FIG. 1.

Furthermore, in order to cure the radical-polymerizable adhesive composition between the laminated electromagnetic steel plates constituting the obtained adhesive laminate in a short time, a curing accelerator is preferably used together. According to the manufacturing method of the present invention, the radical-polymerizable adhesive composition between the electromagnetic steel plates which are steel plate members can be further cured and fixed without providing a degreasing step. Specific examples thereof include the following second and third embodiments, but are not limited thereto.

Second Embodiment

Examples of a method for manufacturing an adhesive laminate using a curing accelerator together include a method for manufacturing an adhesive laminate, including: in a punch-off laminating press method for punching off a steel plate part (electromagnetic steel plate) having a predetermined shape from a strip-shaped steel plate sent intermittently and laminating the steel plate part, a first application step of applying any one of a radical-polymerizable adhesive composition and a curing accelerator for accelerating curing of the radical-polymerizable adhesive composition to a lower surface of the strip-shaped steel plate on an upstream side of a pressing position where the steel plate part is punched off from the strip-shaped steel plate; and a second application step of applying the other one of the radical-polymerizable adhesive composition and the curing accelerator to an upper surface of the strip-shaped steel plate at the pressing position. In addition, the punching oil can be applied to an upper surface and/or a lower surface of the strip-shaped steel plate in the first application step. Each requirement is as described in the first embodiment.

Examples of the curing accelerator include those obtained by dissolving a metal catalyst such as a copper catalyst, a vanadium catalyst, a silver catalyst in an organic solvent such as an alcohol, or the like. Among these catalysts, a copper catalyst is preferable because of being excellent from a viewpoint of anaerobic curability. Examples of the copper catalyst include copper 2-ethylhexylate, copper naphthenate, and the like.

Third Embodiment

Examples of another method for manufacturing an adhesive laminate using a curing accelerator together include a method for manufacturing an adhesive laminate, including: in a punch-off laminating press method for punching off a steel plate part (electromagnetic steel plate) having a predetermined shape from a strip-shaped steel plate sent intermittently and laminating the steel plate part, a first application step of applying a punching oil containing a curing accelerator of a radical-polymerizable adhesive composition to a lower surface of the strip-shaped steel plate on an upstream side of a pressing position where the steel plate part is punched off from the strip-shaped steel plate; and a second application step of applying the radical-polymerizable adhesive composition to an upper surface of the strip-shaped steel plate at the pressing position. Each requirement is as described in the first embodiment.

<Strip-Shaped Steel Plate>

As the strip-shaped steel plate of the present invention, a steel plate which is distributed as a product in a state of being wound into a roll can be used. In the present invention, such a steel plate can be used as it is without being degreased. As the kind of the strip-shaped steel plate, an iron steel plate (such as a cold pressed steel material), an electromagnetic steel plate, and the like can be used.

<Electromagnetic Steel Plate (Steel Plate Part Having Specific Shape)>

The electromagnetic steel plate (steel plate part having a predetermined shape) of the present invention is obtained by punching off a strip-shaped steel plate to which a radical-polymerizable adhesive composition has been applied into a predetermined shape. The thickness of such an electromagnetic steel plate (steel plate part having a predetermined shape) is preferably 0.01 to 3 mm, and more preferably 0.1 to 1 mm because a need to further reduce the thickness of the adhesive laminate is increasing with miniaturization of a motor. In addition, due to a similar need, the thickness of the adhesive layer (cured product of the radical-polymerizable adhesive composition) applied to and formed on the electromagnetic steel plate (steel plate part having a predetermined shape) is preferably 0.1 to 1000 μm, and more preferably 0.5 to 500 μm. In addition, the number of electromagnetic steel plates (steel plate part having a predetermined shape) used for the adhesive laminate is preferably 2 to 500, and more preferably 3 to 50 from a viewpoint of excellent motor efficiency.

An adhesive laminate obtained by the method for manufacturing an adhesive laminate according to the present invention is preferably used for a rotor or a stator of a motor. With such a configuration, the oil (punching oil or the like) and the adhesive composition can be simultaneously applied. Therefore, the process can be largely simplified. In addition, it is possible to provide an ultra-thin and high-performance laminated steel plate for a rotor or a stator, having an excellent cost reduction effect and causing no stress concentration/strain concentration.

<Adhesive Laminate>

An adhesive laminate obtained by laminating electromagnetic steel plates using the radical-polymerizable adhesive composition of the present invention is insulated by a cured product of the radical-polymerizable adhesive composition (adhesive layer). Therefore, the adhesive laminate has a small current loss, high performance, and high reliability, disperses a stress in a plane, and does not cause stress concentration/strain concentration, and therefore is preferably used for a rotor, a stator of a motor, or the like.

<Motor>

A motor using the adhesive laminate of the present invention for a rotor, a stator, or the like is suitably used for vibration of a mobile phone, adjustment of a focus of a camera, driving of a hard disk, driving of an automobile, and the like. A motor having such a configuration has a small current loss and excellent efficiency.

EXAMPLES

The present invention will be specifically described by the following Examples, but the present invention is not limited by the following Examples.

Preparation of Radical-Polymerizable Adhesive Composition for Laminating and Bonding Steel Plates Example 1

70 parts by mass of UE-8071-60BH (60% by mass of epoxy acrylate and 40% by mass of hydroxyethyl methacrylate) manufactured by DIC Corporation and 30 parts by mass of hydroxyethyl methacrylate manufactured by Nippon Shokubai Co., Ltd., corresponding to the component (A), 1 part by mass of cumene hydroperoxide (organic peroxide having a one-hour half-life temperature of 157.9° C.) manufactured by Nippon Yushi Co., Ltd., corresponding to the component (B), 2-hydroxyethyl methacrylate acid phosphate corresponding to the component (C), and 1.5 parts by mass of saccharin (reagent) and 0.02 part by mass of EDTA·2Na (disodium ethylenediaminetetraacetate (dihydrate)) (reagent), corresponding to the component (D) were mixed at room temperature for 60 minutes with a mixer, thus obtaining a radical-polymerizable adhesive composition for laminating and bonding steel plates in Example 1.

Example 2

Preparation was performed in a similar manner to Example 1 except that 30 parts by mass of IBXA (isobornyl acrylate) manufactured by Osaka Organic Chemical Industry Co., Ltd. was added in place of 30 parts by mass of hydroxyethyl methacrylate manufactured by Nippon Shokubai Co., Ltd. in Example 1, thus obtaining a radical-polymerizable adhesive composition for laminating and bonding steel plates in Example 2.

Example 3

Preparation was performed in a similar manner to Example 2 except that UV-3700B (urethane diacrylate having a polyether skeleton) manufactured by Nippon Synthetic Chemical Industry Co., Ltd. was used in place of UE-8071-60BH, and 28 parts by mass of hydroxyethyl methacrylate manufactured by Nippon Shokubai Co., Ltd. was further added in Example 2, thus obtaining a radical-polymerizable adhesive composition for laminating and bonding steel plates in Example 3.

Example 4

Preparation was performed in a similar manner ton Example 1 except that the amount of hydroxyethyl methacrylate manufactured by Nippon Shokubai Co., Ltd. was changed from 30 parts by mass to 20 parts by mass, and 10 parts by mass of Light Acrylate DCP-A (dimethylol-tricyclodecane diacrylate) manufactured by Osaka Organic Chemical Industry Co., Ltd. was further added in Example 1, thus obtaining a radical-polymerizable adhesive composition for laminating and bonding steel plates in Example 4.

Example 5

Preparation was performed in a similar manner to Example 1 except that UE-8071-60BH was omitted, and the amount of hydroxyethyl methacrylate manufactured by Nippon Shokubai Co., Ltd. was changed from 30 parts by mass to 100 parts by mass, thus obtaining a radical-polymerizable adhesive composition for laminating and bonding steel plates in Example 5.

Comparative Example 1

Preparation was performed in a similar manner to Example 1 except that 2-hydroxyethyl methacrylate acid phosphate was omitted in Example 1, thus obtaining a radical-polymerizable adhesive composition for laminating and bonding steel plates in Comparative Example 1.

(1) Tensile Shear Adhesive Strength Test to Electromagnetic Steel Plate

To a test piece of an electromagnetic steel plate having a width of 25 mm, a length of 100 mm, and a thickness of 0.3 mm (35JN300 manufactured by JFE Steel Co., Ltd.), 0.1 g of a primer composition containing 100 parts by mass of punching oil (mineral oil, G6339F manufactured by Nihon Kohsakuyu Co., Ltd.), 100 parts by mass of ethanol, and 0.5 part by mass of copper 2-ethylhexanoate was applied, and was left and dried at 25° C. for three hours.

Next, to the test piece that had been subjected to the primer treatment, 0.1 g of the radical-polymerizable adhesive composition for laminating and bonding steel plates was applied. Another test piece that had been subjected to the primer treatment was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). Results are indicated in Table 1. Note that in the present invention, the tensile shear adhesive strength to the above electromagnetic steel plate (adhesion test piece) is 8.0 MPa or more, preferably 8.2 MPa or more, and more preferably 8.5 MPa or more.

(2) Tensile Shear Adhesive Strength Test to Cold-Rolled Steel Plate (SPCC-SD)

To a test piece of a cold-rolled steel plate (SPCC-SD) having a width of 25 mm, a length of 100 mm, and a thickness of 1 mm, 0.1 g of a primer composition containing 100 parts by mass of punching oil (mineral oil, G6339F manufactured by Nihon Kohsakuyu Co., Ltd.), 100 parts by mass of ethanol, and 0.5 part by mass of copper 2-ethylhexanoate was applied, and was left and dried at 25° C. for three hours.

Next, to the test piece that had been subjected to the primer treatment, 0.1 g of the radical-polymerizable adhesive composition for laminating and bonding steel plates was applied. Another test piece that had been subjected to the primer treatment was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). Results are indicated in Table 2.

Note that in the present invention, the tensile shear adhesive strength to the above cold-rolled steel plate (SPCC-SD) is preferably 4.0 MPa or more, more preferably 7.0 MPa or more, and still more preferably 10.0 MPa or more.

TABLE 1

|  | Example 1 | Example 2 | Example 3 | Example 4 | Example 5 | Comparative Example 1 |
| --- | --- | --- | --- | --- | --- | --- |
| Tensile shear adhesive strength to electromagnetic steel plate (MPa) | 10.9 | 12.5 | 9.0 | 14.8 | 8.9 | 7.6 |
| Tensile shear adhesive strength to cold-rolled steel plate (SPCC-SD) (MPa) | 20.3 | 21.7 | 16.6 | 26.4 | 12.8 | 3.9 |

Examples 1 to 5 of Table 1 indicate that the radical-polymerizable adhesive composition for laminating and bonding steel plates of the present invention has an adhesive force to an electromagnetic steel plate or a cold-rolled steel plate (SPCC-SD), having a surface covered with a punching oil. The radical-polymerizable adhesive for laminating and bonding steel plates of the present invention has an adhesive force to an electromagnetic steel plate or a cold-rolled steel plate (SPCC-SD), having a surface covered with a punching oil, therefore, a step of applying an adhesive composition after the punching oil applied to the electromagnetic steel plate is removed in a process of manufacturing an adhesive laminate can be omitted. In addition, an adhesive laminate in which steel plates strongly adhere to each other with a cured product of the radical-polymerizable adhesive composition for laminating and bonding steel plates of the present invention is insulated by the cured product, and therefore has a small current loss, high performance, and high reliability.

Meanwhile, since Comparative Example 1 does not contain the component (C) of the present invention. Therefore, it is found that Comparative Example 1 does not exhibit an adhesive force to an electromagnetic steel plate or a cold-rolled steel plate (SPCC-SD) having a surface covered with a punching oil.

(3) Tensile Shear Adhesive Strength Test to Electromagnetic Steel Plate (when No Primer Composition is Used)

To a test piece of an electromagnetic steel plate having a width of 25 mm, a length of 100 mm, and a thickness of 0.3 mm (35JN300 manufactured by JFE Steel Co., Ltd.), 0.1 g of the radical-polymerizable adhesive composition for laminating and bonding steel plates in Example 1 was applied. Another test piece was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). As a result of the measurement, the tensile shear adhesive strength to an electromagnetic steel plate using the radical-polymerizable adhesive composition in Example 1 (when no primer composition was used) was 13.3 MPa.

(4) Tensile Shear Adhesive Strength Test to Electromagnetic Steel Plate (when a Primer Composition Containing No Punching Oil is Used)

To a test piece of an electromagnetic steel plate having a width of 25 mm, a length of 100 mm, and a thickness of 0.3 mm (35JN300 manufactured by JFE Steel Co., Ltd.), 0.1 g of a primer composition containing 100 parts by mass of ethanol and 0.5 part by mass of copper 2-ethylhexanoate was applied, and was left and dried at 25° C. for three hours.

Next, to the test piece that had been subjected to the primer treatment, 0.1 g of the radical-polymerizable adhesive composition for laminating and bonding steel plates in Example 1 was applied. Another test piece that has been subjected to the primer treatment was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). As a result of the measurement, the tensile shear adhesive strength to an electromagnetic steel plate using the radical-polymerizable adhesive composition in Example 1 (when a primer composition containing no punching oil was used) was 12.4 MPa.

(5) Tensile Shear Adhesive Strength Test to Cold-Rolled Steel Plate (SPCC-SD) (when No Primer Composition is Used)

To a test piece of a cold-rolled steel plate (SPCC-SD) having a width of 25 mm, a length of 100 mm, and a thickness of 1 mm, 0.1 g of the radical-polymerizable adhesive composition for laminating and bonding steel plates in Example 1 was applied. Another test piece was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). As a result of the measurement, the tensile shear adhesive strength to a cold-rolled steel plate (SPCC-SD) using the radical-polymerizable adhesive composition in Example 1 (when no primer composition was used) was 15.9 MPa.

(6) Tensile Shear Adhesive Strength Test to Cold-Rolled Steel Plate (SPCC-SD) (when a Primer Composition Containing No Punching Oil is Used)

To a test piece of a cold-rolled steel plate (SPCC-SD) having a width of 25 mm, a length of 100 mm, and a thickness of 1 mm, 0.1 g of a primer composition containing 100 parts by mass of ethanol and 0.5 part by mass of copper 2-ethylhexanoate was applied, and was left and dried at 25° C. for three hours.

Next, to the test piece that had been subjected to the primer treatment, 0.1 g of the radical-polymerizable adhesive composition for laminating and bonding steel plates in Example 1 was applied. Another test piece that has been subjected to the primer treatment was superimposed thereon such that a length of a longer side end thereof was 10 mm. A weight of 100 g was placed on a bonding surface and fixed at 25° C. for 24 hours to obtain an adhesion test piece. Note that the radical-polymerizable adhesive composition protruding from the bonding surface was wiped off.

Next, an end of the adhesion test piece was pulled with a universal tensile tester at a pulling speed of 50 mm/min, and tensile shear adhesive strength (MPa) was measured according to JIS K6850 (1999). As a result of the measurement, the tensile shear adhesive strength to a cold-rolled steel plate (SPCC-SD) using the radical-polymerizable adhesive composition in Example 1 (when a primer composition containing no punching oil was used) was 15.5 MPa. From the measurement results of the tensile shear adhesive strength of the above (5) and (6), it is found that the radical-polymerizable adhesive composition for laminating and bonding steel plates of the present invention exhibits an unexpected effect that the tensile shear adhesive strength is higher when a primer composition containing a punching oil is not used than when a primer composition containing no punching oil is used.

Furthermore, the viscosity of each of the radical-polymerizable adhesive compositions for laminating and bonding steel plates in Examples 1 to 5 and Comparative Example 1 was evaluated.

(7) Measurement of Viscosity 0.5 mL of each of the radical-polymerizable adhesive compositions was sampled and discharged into a measuring cup. A viscosity was measured with an EHD type viscometer (manufactured by Toki Sangyo Co., Ltd.) in an environment of 25° C. under a condition of a shear rate of 76.6 [1/s], and evaluated based on the following criteria. Results are indicated in Table 2. Note that the viscosity of the radical-polymerizable adhesive composition is preferably within a range of 0.05 Pa·s or more and 30 Pa·s or less, and more preferably within a range of 0.5 Pa·s or more and 15 Pa·s or less from a viewpoint that the radical-polymerizable adhesive composition applied to an electromagnetic steel plate easily and appropriately spreads over the entire surface, and simultaneously, the radical-polymerizable adhesive composition does not extremely protrude from an adhesive surface during bonding of the electromagnetic steel plates.

Evaluation Criteria

A: A viscosity is 0.5 Pa·s or more and 15 Pa·s or less
B: A viscosity is 0.05 Pa·s or more and less than 0.5 Pa·s, or more than 15 Pa·s and 30 Pa·s or less
C: A viscosity is less than 0.05 Pa·s or more than 30 Pa·s.

TABLE 2

|  | Example 1 | Example 2 | Example 3 | Example 4 | Example 5 | Comparative Example 1 |
|---|---|---|---|---|---|---|
| Measurement of viscosity | A | A | A | A | B | A |

From the results in Table 2, each of Examples 1 to 4 is a composition using a radical-polymerizable monomer and a radical-polymerizable oligomer or polymer together as the component (A), and it has been confirmed that each of Examples 1 to 4 is a radical-polymerizable adhesive composition suitable for an adhesive lamination method because of being within an appropriate viscosity range. Meanwhile, the composition in Example 5 is a composition containing only a radical-polymerizable monomer as the component (A), but slightly deviates from the appropriate viscosity range.

Preparation of Radical-Polymerizable Adhesive Compositions for Laminating and Bonding Steel Plates in Examples 6 to 10 and Comparative Example 2

Those obtained by adding 2 parts by mass of a photo-radical generator, 1-hydroxy-cyclohexyl-phenyl-ketone which is one of the radical-polymerization initiators as the component (B) to 100 parts by mass of Examples 1 to 5 and Comparative Example 1 described above were used as radical-polymerizable adhesive compositions for laminating and bonding steel plates in Examples 6 to 10 and Comparative Example 2, respectively.

The glass transition point of each of cured products of the radical-polymerizable adhesive compositions for laminating and bonding steel plates in Examples 6 to 10 and Comparative Example 2 was evaluated.

(8) Measurement of Glass Transition Point

The thickness of each of the radical-polymerizable adhesive compositions in Examples 6 to 10 and Comparative Example 2 was set to 1 mm, and each of the radical-polymerizable adhesive compositions was irradiated with an ultraviolet ray at 60 kJ/m$^2$ as a curing condition using an ultraviolet irradiator of a high-pressure mercury lamp, thus manufacturing a cured product of each of the radical-polymerizable adhesive compositions.

Next, the obtained cured product was cut into a size of 10 mm in width×50 mm in length×1.0 mm in thickness, and measurement was performed using DMS 6100 manufactured by Seiko Instruments Inc. within a temperature range of 25 to 350° C. at a temperature-rising rate of 5° C./min at a frequency of 1 Hz in a tension mode. The glass transition point is determined as a peak value of tan δ. Results are indicated in Table 3. Note that the glass transition point of a cured product of the radical-polymerizable adhesive composition is preferably 60° C. or higher, and more preferably 70° C. or higher from a viewpoint that heat resistance of an adhesive laminate can be improved.

Evaluation Criteria

A: A glass transition point is 100° C. or higher
B: A glass transition point is 70° C. or higher and lower than 100° C.
C: A glass transition point is 60° C. or higher and lower than 70° C.
D: A glass transition point is lower than 60° C.

TABLE 3

| | Example 6 | Example 7 | Example 8 | Example 9 | Example 10 | Comparative Example 2 |
|---|---|---|---|---|---|---|
| Measurement of glass transition point | B | B | C | A | C | B |

From the results in Table 3, each of Examples 6, 7, and 9 is a composition containing an epoxy (meth)acrylate as the radical-polymerizable oligomer or polymer as the component (A), and it has been confirmed that each of Examples 6, 7, and 9 is a radical-polymerizable adhesive composition suitable for an adhesive lamination method because of having an appropriate glass transition point. Meanwhile, each of the compositions in Examples 8 and 10 is a composition containing no epoxy (meth)acrylate as the radical-polymerizable oligomer or polymer as the component (A), and slightly deviates from the range of the appropriate glass transition point.

INDUSTRIAL APPLICABILITY

The present invention provides a radical-polymerizable adhesive composition for laminating and bonding steel plates, capable of providing an adhesive laminate that contributes to simplification of a process in an adhesive lamination method, and high performance and high reliability of a rotor or a stator of a motor. Therefore, the present invention is extremely effective and can be applied to a wide range of fields, and therefore is industrially useful.

REFERENCE SIGNS LIST

1 Apparatus for manufacturing adhesive laminate obtained by laminating electromagnetic steel plates
2 Strip-shaped steel plate
3 Roll device
4 Press forming device
5 Application device for punching oil or radical-polymerizable adhesive composition
6 Storage holding hole for adhesive laminate
7 Punch-off punching unit
8 Adhesive laminate
9 Press punching unit
10 Lower portion of press forming device
11 Bottom portion of press forming device

The invention claimed is:

1. A radical-polymerizable adhesive composition for laminating and bonding steel plates, comprising:
component (A): a radical-polymerizable compound consisting of an epoxy (meth) acrylate, 2-hydroxyethyl methacrylate, and dimethylol tricyclodecane di(meth) acrylate, wherein a content of the dimethylol tricyclodecane di(meth)acrylate is in a range of more than 0 to 10 parts by mass, a content of the 2-hydroxyethyl methacrylate is in a range of 48 to 58 parts by mass, and a content of the epoxy (meth)acrylate is 42 parts by mass, with respect to a total amount of 100 parts by mass of the epoxy (meth)acrylate, the 2-hydroxyethyl methacrylate, and the dimethylol tricyclodecane di(meth)acrylate;
component (B): a radical-polymerization initiator;
component (C): 2-hydroxyethyl (meth) acrylate acid phosphate, wherein a content of the component (C) is in a range of 0.1 to 50 parts by mass with respect to 100 parts by mass of the component (A); and
component (D): an anaerobic catalyst, wherein the anaerobic catalyst consists of at least one compound selected from the group consisting of saccharin, an amine compound, an azole compound, a mercaptan compound, and a hydrazine compound, and the mercaptan compound consists of at least one compound selected from the group consisting of n-dodecyl mercaptan, ethyl mercaptan, and butyl mercaptan, wherein the radical-polymerizable adhesive composition for laminating and bonding steel plates has a viscosity of 0.5 Pa·s or more and 15 Pa·s or less in a viscosity measurement, and the viscosity measurement is carried out as follows:
- 0.5 mL of the radical-polymerizable adhesive composition for laminating and bonding steel plates is sampled and discharged into a measuring cup; and
- a viscosity is measured with an elastohydrodynamic (EHD) viscometer in an environment of 25° C. under a condition of a shear rate of 76.6 [1/s].

2. The radical-polymerizable adhesive composition for laminating and bonding steel plates according to claim 1, wherein a glass transition point of a cured product of the radical-polymerizable adhesive composition is 100° C. or higher in a glass transition point measurement, and the glass transition point measurement is carried out as follows:
- the radical-polymerizable adhesive composition for laminating and bonding steel plates is sandwiched between two polytetrafluoroethylene plates with a clearance of 1.0 mm;
- thereafter, the composition is heated at 180° C. for one hour as a curing condition to manufacture a cured product;
- next, the manufactured cured product is cut into a size of 10 mm in width×50 mm in length×1.0 mm in thickness, and measurement is performed using DMS 6100 within a temperature range of 25 to 350° C. at a temperature-rising rate of 5° C./min in a tension mode of frequency 1 Hz; and
- the glass transition point is determined as a peak value of tan δ.

3. The radical-polymerizable adhesive composition for laminating and bonding steel plates according to claim 1, which has anaerobic curability.

4. The radical-polymerizable adhesive composition for laminating and bonding steel plates according to claim 1, wherein an amount of the component (B) is 0.1 to 5 parts by mass with respect to 100 parts by mass of the component (A).

5. The radical-polymerizable adhesive composition for laminating and bonding steel plates according to claim 1, wherein an amount of the component (D) is 0.1 to 10 parts by mass with respect to 100 parts by mass of the component (A).

6. The radical-polymerizable adhesive composition for laminating and bonding steel plates according to claim 1, which has a tensile shear adhesive strength to a cold-rolled steel plate (SPCC-SD) of 10.0 MPa or more.

7. The radical-polymerizable adhesive composition for laminating and bonding steel plates according to claim 1, wherein the composition consists of the components (A) to (D) and optionally ethylenediaminetetraacetic acid or a 2-sodium salt thereof.

8. The radical-polymerizable adhesive composition for laminating and bonding steel plates according to claim 7, wherein the component (D) consists of at least one compound selected from the group consisting of saccharin, n-dodecyl mercaptan, ethyl mercaptan, and butyl mercaptan.

9. The radical-polymerizable adhesive composition for laminating and bonding steel plates according to claim 1, wherein the composition consists of the components (A) to (D) and optionally an additive selected from the group consisting of a filler, an elastomer, a storage stabilizer, an antioxidant, a light stabilizer, a heavy metal deactivator, a silane coupling agent, a tackifier, a plasticizer, a defoamer, a pigment, a rust inhibitor, a leveling agent, a dispersant, a rheology modifier, and a flame retardant.

10. The radical-polymerizable adhesive composition for laminating and bonding steel plates according to claim 9, wherein
- the filler is glass, fumed silica, alumina, mica, ceramics, a silicone rubber powder, calcium carbonate, aluminum nitride, a carbon powder, kaolin clay, dried clay mineral, dried diatomaceous earth, polyethylene, polypropylene, nylon, crosslinked crosslinked polystyrene, polyester, polyvinyl alcohol, polyvinyl butyral, or polycarbonate;
- the storage stabilizer is a radical absorber or a metal chelating agent;
- the antioxidant is a quinone-based compound, a phenol, a phosphorus-based compound, a sulfur-based compound selected from the group consisting of dilauryl 3,3'-thiodipropionate, dimyristyl 3,3'-thiodipropionate, distearyl 3,3'-thiodipropionate, pentaerythrityltetrakis (3-laurylthiopropionate), and 2-mercaptobenzimidazole, an amine-based compound, a lactone-based compound, or a vitamin E-based compound; and
- the silane coupling agent is γ-chloropropyl trimethoxysilane, octenyl trimethoxysilane, glycidoxyoctyl trimethoxysilane, β-(3,4-epoxycyclohexyl) ethyl trimethoxysilane, γ-glycidoxypropyl trimethoxysilane, γ-ureidopropyl triethoxysilane, or p-styryl trimethoxysilane.

11. An adhesive laminate obtained by laminating electromagnetic steel plates using the radical-polymerizable adhesive composition for laminating and bonding steel plates set forth in claim 1.

12. A motor using the adhesive laminate set forth in claim 11.

13. A method for manufacturing an adhesive laminate, comprising: applying a radical-polymerizable adhesive composition for laminating and bonding steel plates to a surface of a strip-shaped steel plate; and laminating electromagnetic steel plates with a press molding machine,
wherein the radical-polymerizable adhesive composition for laminating and bonding steel plates comprises:
- component (A): a radical-polymerizable compound consisting of an epoxy (meth)acrylate, 2-hydroxyethyl methacrylate, and dimethylol tricyclodecane di(meth)acrylate, wherein a content of the dimethylol tricyclodecane di(meth)acrylate is in a range of more than 0 to 10 parts by mass, a content of the 2-hydroxyethyl methacrylate is in a range of 48 to 58 parts by mass, and a content of the epoxy (meth) acrylate is 42 parts by mass, with respect to a total amount of 100 parts by mass of the epoxy (meth) acrylate, the 2-hydroxyethyl methacrylate, and the dimethylol tricyclodecane di(meth)acrylate;
- component (B): a radical-polymerization initiator;
- component (C): 2-hydroxyethyl (meth)acrylate acid phosphate, wherein a content of the component (C) is 0.1 to 50 parts by mass with respect to 100 parts by mass of the component (A); and
- component (D) an anaerobic catalyst, wherein the anaerobic catalyst consists of at least one compound selected from the group consisting of saccharin, an amine compound, an azole compound, a mercaptan compound, and a hydrazine compound, and the mercaptan compound consists of at least one compound selected from the group consisting of n-dodecyl mercaptan, ethyl mercaptan, and butyl mercaptan, and the radical-polymerizable adhesive composition for laminating and bonding steel plates has a viscosity of 0.5 Pa·s or more and 15 Pa·s or less in a viscosity measurement, and the viscosity measurement is carried out as follows:

0.5 mL of the radical-polymerizable adhesive composition for laminating and bonding steel plates is sampled and discharged into a measuring cup; and a viscosity is measured with an elastohydrodynamic (EHD) viscometer in an environment of 25° C. under a condition of a shear rate of 76.6 [1/s].

14. The method according to claim 13, further comprising:

before the applying the radical-polymerizable adhesive composition, applying a primer composition containing a copper catalyst containing copper 2-ethylhexanoate or copper naphthate, a punching oil, and a solvent to the strip-shaped steel plate.

15. The method according to claim 13, comprising applying a punching oil simultaneously or separately with the radical-polymerizable adhesive composition for laminating and bonding steel plates to the surface of the strip-shaped steel plate.

* * * * *